March 17, 1964     E. SCHLUETER     3,124,993
QUARTER TURN FASTENER HAVING CAMMING HEAD
Filed Oct. 21, 1959
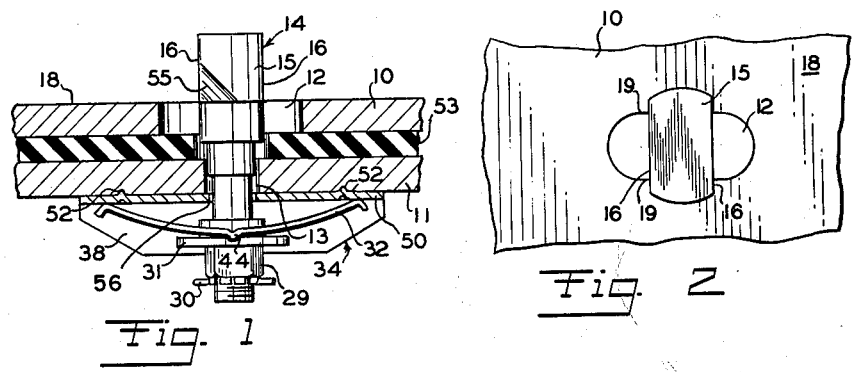
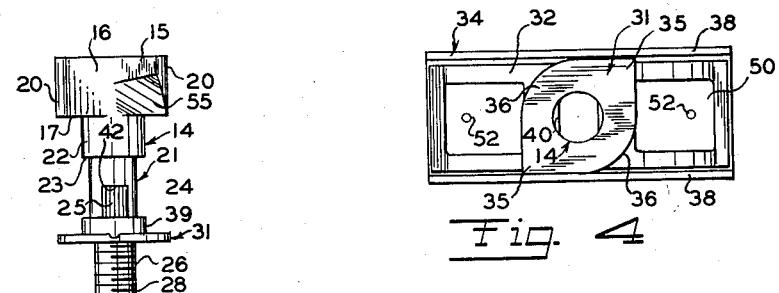
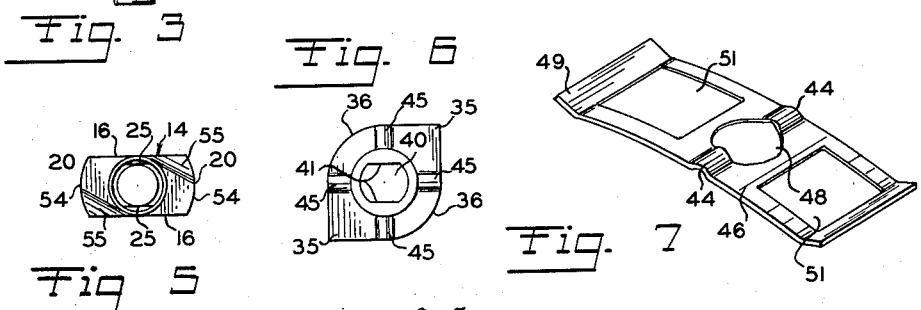
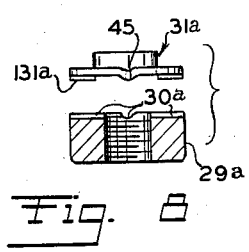
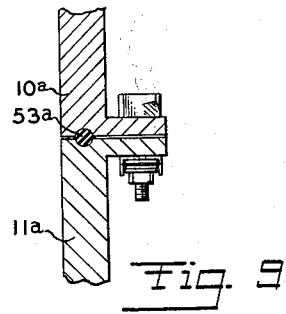
INVENTOR.
ERNEST SCHLUETER
BY
AGENT

United States Patent Office 3,124,993
Patented Mar. 17, 1964

3,124,993
QUARTER TURN FASTENER HAVING
CAMMING HEAD
Ernest Schlueter, 74 Edwards Road, Troy, N.Y.
Filed Oct. 21, 1959, Ser. No. 847,842
3 Claims. (Cl. 85—1)

This invention relates to fastening devices and more particularly to cam bolts though it is noted that in some of the claims the invention is not limited to cam bolts nor even to fastening devices.

Objects of the invention are to provide an improved device or apparatus of this kind which can be inserted and then turned to full locking position by a quarter turn and unlocked and removed with no more rotation than a quarter turn.

Another object is to produce a quarter turn fastener that will not cause lateral slip or deflection of the joined members.

Other objects of the invention are to provide an improved device of this kind which will hold a cam bolt in locked and unlocked position and which can be adjusted for thickness of the material bolted.

Additional objects of the invention are to effect simplicity and efficiency in such apparatus and to provide an extremely simple device or apparatus of this kind which is economical, durable and reliable in operation, and economical to manufacture and install.

Still other objects of the invention will appear as the description proceeds; and while herein details of the invention are described in the specification and some of the claims, the invention as described in some claims is not limited to these, and many and various changes may be made without departing from the scope of the invention as claimed in the broader claims.

The inventive features for the accomplishment of these and other objects are shown herein in connection with a cam bolt which briefly stated, includes a head having undercut camming surfaces and a shank part having a stop washer therein, and slidable with respect thereto, and means for limiting movement of the washer.

In the accompanying drawing showing, by way of example, two of many possible embodiments of the invention, FIG. 1 is a sectional view of plate members held together by the cam bolt the latter being shown substantially in side elevation;

FIG. 2 is a plan of the assembly of the members and bolt of FIG. 1;

FIG. 3 is a front elevation of the bolt and washer;

FIG. 4 is a bottom view showing the bolt, washer and said means;

FIG. 5 is a bottom view showing the bottom of the bolt;

FIG. 6 is a plan of the washer;

FIG. 7 is a perspective of an element of FIG. 4;

FIG. 8 is an exploded view of another form of the washer and retaining means, and FIG. 9 shows another form of specific use for the bolt.

The invention is shown in FIG. 1 in connection with upper and lower more or less rigid plates 10 and 11.

The upper plate is provided with a somewhat oblong hole or slot 12 and the lower plate with a circular hole 13 preferably of a diameter less than the width of the hole 12.

The plates are held together by a cam bolt, generally designated 14 and disposed in the hole 13 and having a head 15 provided with generally flat parallel side faces 16 for engagement by a tool such as a wrench. The lower part of the head terminates as at 17 in a plane to which the longitudinal axis of the bolt is perpendicular so as, in locking position, to engage the upper face 18 of the plate 10 at opposite marginal portions 19 of the slot 12. The width of the head between the faces 16 and the width, as well as the length, of the slot are such that the head can be easily passed through the slot when the head is longitudinal to the slot, and of course, the length of the head is such that when the latter is transverse to the slot lateral abutment portions as at 20 between the faces extend over the mentioned margins 19.

The shank portion, generally designated 21, of the bolt includes an upper collar-like part 22 of diameter equal approximately to the distance between the faces 16, and a main stem or shaft 24 of reduced diameter to leave a shoulder 23 for holding the bolt, before tightening, high enough for the head to project sufficiently above the upper plate for the mode of operation described later.

The diameter of the hole 13 in the lower plate is of about the same diameter as the shaft 24 so that the bolt may turn freely in the hole in substantially axial alinement therewith. The lower part of the shaft is ground or flattened at opposite sides as at 25 to provide flat parallel faces, while the extreme lower end portion 26 is of still further reduced diameter, a little less than the distance between faces at 25, and provided with threads 28.

In assembly and use, the threaded portion 26 is provided with a nut 29 which, in FIG. 1, is shown secured against rotation with respect to the bolt by a cotter pin 30. Interposed between the nut and lower plate 11 are, a stop washer 31 against the nut, a spring washer 32 against the stop washer, and an inverted channel stop-plate 34 between the spring washer and the plate 11.

The stop washer 31 is of eye-shape having opposite right angular corners 35 the legs of which tangentially are joined at intermediae circular arcs 36, the diameter between the arcs being slightly less than the distance between the flanges 38 of the channel stop-plate. The stop washer is provided with an upwardly extending hub portion 39 provided with a hole 40 having a pair of opposed flat interior walls 41 for engagement with the side faces 25 at the stem 24 so that the stop washer may slide upwardly freely on the stem until stopped by the undercut shoulders 42 thereon. The engagement between faces 25 and the wall 41 permits of very little rotation of the stem with respect to the washer 31.

The stop washer is normally restrained against movement of substantially more than 90° by engagement with the flanges 38, and is normally detained in one of its extreme positions of turning by engagement of a mid crimp or ridge 44 in the spring washer in a pair of four upwardly open radial grooves 45 in the stop washer 90° apart. The spring washer is of somewhat rectangular shape being bowed so that its mid portion 46, having the ridge 44 transverse thereto is normally urged against the stop washer, and said mid portion 46 being provided with a hole 48 large enough to receive the hub 39 therethrough. The end portions 49 of the spring washer bear resiliently against the web 50 of the stop plate and fit more or less closely against the flanges 38. For ease in handling during assembly, the washer portions 49 are provided with large cut-outs 51 so that the mid portion 46 can be held by the fingers when the spring washer is in the channel stop plate. Detent means, as at 52, prevent rotation of the stop plate 34 with respect to the structural plate 11.

Often it is preferable, but not always necessary, to provide an intermediate resilient member 53 between the upper and lower plates. These resilient members are often a gasket and may be merely an O-ring or beading as 53a when flanged material such as piping is joined. The resilience and strength of the spring washer eliminates many needs for an intermediate layer.

The head 15 preferably has its lateral end portions rounded as at 54 (as are the ends of the slot 12) to permit easy entrance of the head up through the plate 10. The lateral end portions are undercut as diagonally opposite corners to provide camming surfaces 55 extending to, say, about two thirds the height of the head.

In another form of the invention as shown in FIG. 8 the stop washer 31a is similar to washer 31 in that it is identically provided with detent grooves 45 but these grooves are crimped in the washer to form lower detent radial ridges 131a to engage in radial notches 30a in the nut 29a, and with some loads and tensions of the spring washer no cotter pin 30 is required.

In use of the invention, the same elements may be used for a large variety of load plate thicknesses by merely advancing the stop washer 31 to compensate for thin loads. In practice the spring washer 32 may be quite stiff and the slope of cam surface 55 slight so that the movement is more like the action of a screw than a cam as shown. However for most work, a cam slope of about 45° is suitable.

By having the stem 24 fit well in the plate hole 13 the bolt does not wander from correct position on the lower plate. The cam surfaces 55 and abutment shoulders 17 are both symmetric to the axis of rotation of the bolt so that there is only a tendency to turn, as opposed to shift, the upper plate 10 and turning tendencies can usually be easily prevented.

The collar portion 22 is generally related to the thickness of the upper plate so that the head is supported by the shoulders 23 on the lower plate to a sufficient height to enable the cam surfaces 55 to ride over the surface 18. The surfaces 55 are preferably of slightly diminishing slope to compensate for the increase in force exerted by the spring washer during its being distorted.

The channel plate 34 is of course provided with a hole 56 for passing the stem through the web.

The invention is particularly suited to connecting up flanged material such as parts 10a and 11a, where quick work is required. The bolt may be located in close quarters and the slot 12 so directed that a quarter turn may lock or unlock the bolt.

The instant cam bolt is particularly adapted for use with heavy loads and load plates, such as closures used on military tanks. The top washer engages the flanges over maximum distance so that in either locking or unlocking the washer and bolt are positively stopped in a position substantially where the washer is to be detained.

The stop washer is always close enough to the flanges during turning so that the assembly does not tend to become canted even when trial, loose, approximation of the correct position of the nut are being made, especially when the web hole 56 is with a fairly good but loose fit. The same is true for the fitting of the hub in the spring washer.

The invention is easily adapted to production in fixed dimensions when large number of a given size are required. For example the faces 25 can be ground so that the shoulders 42 are in a position of the stem that will enable the nut to be screwed on all the way and the need for adjustment be avoided.

The invention claimed is:

1. A cam bolt assembly comprising a cam bolt having a head provided with lateral end portions having under and side faces, the latter being parallel to each other and to the bolt axis, at least a portion of the diagonally opposite end corners of said end portions being removed to form a cam surface merging the adjacent under and side faces, the under face including an area disposed normal to the bolt axis, said cam surfaces engaging slot marginal portions of a plate-like member to be held by the assembly, and the cam bolt also having a shank, a channel shaped stop member on the shank and having a web and flanges, the shank passing through the web; an eye-shaped stop-washer on the bolt and between the flanges, the minimum diameter of the stop-washer being slightly less than the distance between flanges, and the stop washer having diagonally opposite substantially right angular corner portions to engage the flanges and limit turning of the washer to about 90°, the stop washer having radial grooves open toward the head and web and provided with a hub projecting toward the web, the stop washer and hub being slidable on the bolt and constrained by cooperating non-circular means to turn therewith; a bowed rectangular spring washer having end portions engaging the web, closely fitting between the flanges, and provided in its mid portion with an opening to receive the hub of the stop-washer, the mid portion being provided with transverse detent ridge means to engage in said grooves when said corner portions are substantially at said flanges, and means on the outer end of the bolt for fixing the maximum distance between the stop washer and the head.

2. An assembly as claimed in claim 1, the last mentioned means being a nut threaded on the outer end portion of the bolt and against the stop washer.

3. An assembly as claimed in claim 2, said stop washer being provided with radial detent ridges projecting toward the nut, and the nut being provided with radial recesses to receive the detent ridges of the stop washer.

References Cited in the file of this patent

UNITED STATES PATENTS

| | | |
|---|---|---|
| 2,011,472 | Chobert | Aug. 13, 1935 |
| 2,216,385 | Chobert | Oct. 1, 1940 |
| 2,334,188 | Gazley | Nov. 16, 1943 |
| 2,434,876 | Warren | Jan. 20, 1948 |
| 2,601,213 | Poupitch | June 17, 1952 |
| 2,631,488 | Tansey | Mar. 17, 1953 |
| 2,671,254 | Meyer | Mar. 9, 1954 |
| 2,722,290 | Van Halteren | Nov. 1, 1955 |
| 2,900,697 | Cuss | Aug. 25, 1959 |